Figure 1:
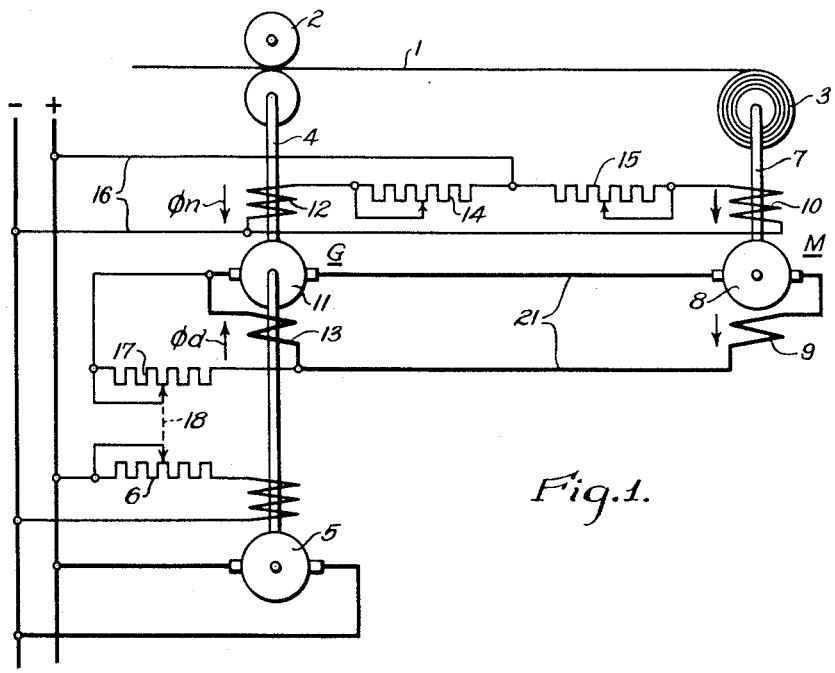

April 19, 1949.  W. R. HARRIS  2,467,743
CORE TYPE REEL DRIVE
Filed Feb. 24, 1947

WITNESSES:
Robert C. Baird
Thru. C. Groome

INVENTOR
Walter R. Harris.
BY
C. M. Avery
ATTORNEY

UNITED STATES PATENT OFFICE 2,467,743

CORE TYPE REEL DRIVE

Walter R. Harris, Pittsburgh, Pa., assignor to Westinghouse Electric Corporation, East Pittsburgh, Pa., a corporation of Pennsylvania Application February 24, 1947, Serial No. 730,633

5 Claims. (Cl. 318—6)

My invention relates to electric drives for winding material, such as yarn, threads, strands, strips, webs and sheets of paper, textile, or metal, while maintaining the material being wound under substantially constant tension.

In conventional electric drives of this kind, a direct-current variable speed motor is used for winding or unwinding the reel of material, and a current regulator is provided to control the energization of the motor in accordance with the progressive change in the diameter of the reel of material so as to secure the desired constancy of tension in the material.

The copending application Serial No. 730,501 of R. R. Baker filed February 24, 1947, discloses an electric reel drive which avoids the use of additional current regulating apparatus for the drive motor and affords a regulation for substantially constant reeling tension by virtue of inherent electric characteristics of the drive system. My invention relates especially to electric drives of the general type disclosed in the just-mentioned application and has for its main object to improve such drives by greatly increased economy of performance and also by increased safety of operation at reduced loads on the drive motor.

More particularly, it is an object of my invention to provide a drive in which the power losses within the self-regulating drive system are reduced to a minimum, thus affording a correspondingly reduced power input for a given power output of the reel drive motor.

Another object of the invention, in conjunction with the foregoing, is to improve drive systems of the type above referred to in such a manner as to limit the speed of the reel drive motor in the event of a break in the material to be reeled or when the reel drive is started with no material on the reel core or with the material being slack, thus permitting a reduction or elimination of much of the auxiliary protective equipment otherwise needed.

In order to achieve these objects and in accordance with a feature of my invention, I provide a variable voltage drive with a series type reel drive motor that operates in the unsaturated and substantially linear region of its magnetic saturation characteristic, and I energize this motor from a generator which, in addition to its separately excited main field winding, has a series field winding differentially related to the main field winding and connected in series with the motor so that the voltage drop across the differential generator field winding is proportional to the load current flowing through the motor. I further equip the generator series field winding with a field rheostat that permits adjusting the just-mentioned voltage drop so that the ratio of the main and differential fields in the generator has a singular value which, at the minimum diameter of the reel to be driven by the motor, is expressed by the equation:

$$\frac{\phi m}{\phi d} = \frac{1}{\sqrt{\frac{D2}{D1}+1}}$$

wherein $\phi m$ represents the field flux of the generator main field winding, $\phi d$ the field flux of the generator differential field winding, D2 the maximum diameter of the reel of the material, and D1 the minimum diameter of the reel.

According to another feature of my invention, I provide the reel drive motor with an additional field winding which acts cumulatively relative to the series field winding of the motor and receives constant excitation so that the field strength of the separately excited motor field winding is a fraction, preferably about 30%, of the field strength of the series field winding at full load and rated maximum speed of the motor. Such a separately excited field winding in the motor has no appreciable effect on the desired maintenance of constant tension in the material to be reeled but prevents the motor from running at excessive speed when the material is slack, or breaks, or when the drive is started with no material on the reel core.

The foregoing and other objects and features of my invention will be apparent from the embodiment illustrated in the drawing and described hereinafter.

Figure 2:
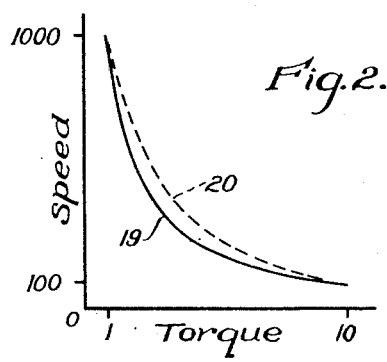

Figure 1 of the drawing exemplifies the invention by the diagrammatic illustration of paper machinery in conjunction with the circuit diagram of a reel drive designed and operative in accordance with the invention, while Figure 2 is an explanatory co-ordinate diagram of speed torque characteristics.

According to Fig. 1, the material 1, consisting of a paper web, passes from a fabricating or processing machinery 2, here represented by a roll press onto the reel core 3 to be wound up under substantially constant tension.

The machinery 2 is driven through a suitable transmission, here schematically represented by a shaft connection 4, from an electric motor 5 or other source of mechanical driving energy, and this motor is associated with speed adjusting means represented by a speed adjusting rheostat 6.

The reel core 3 is driven through a transmission 7 from the armature 8 of a direct-current motor M which has a series field winding 9 and a separately excited shunt-type field winding 10. The transmission 7, here shown schematically as a shaft connection, may include the reduction gears usually needed for such reel drives.

The motor armature 8 and the field winding 9 are series energized from the armature 11 of a generator G which has a series field winding 13 disposed in the motor load circuit and a separately excited main field winding 12. The armature 11 of generator G is driven from the transmission 4 at a speed proportional to that of the fabricating machinery 2 and hence proportional to the linear traveling speed of the material 1 as it passes from the machinery 2 to the reel. Consequently the voltage generated in the armature 11 and impressed on the load circuit is likewise proportional to the linear traveling speed of the material, assuming that the generator G operates within the unsaturated and substantially linear range of its magnetic saturation characteristic. The relation of the generator field windings 12 and 13 is such that the field flux $\phi d$ of the winding 13 is in opposition to the main field flux $\phi n$ of the main field winding 12, while the fields of the two field windings 9 and 10 in motor M are cumulative with respect to each other.

The field windings 12 and 10 receive constant excitation through respective calibrating rheostats 14 and 15 from the terminals 16 of a direct-current source. The adjustment of the rheostats 14 and 15 is normally fixed during the performance of the drive system.

A field rheostat 17 is connected with the differential series field winding 13 of the generator G in order to permit adjusting the voltage drop across winding 13. The slide contact of field rheostat 17 is mechanically interlocked with the adjusting member of the speed control means 6 as is indicated at 18. As a result, when the speed of the machinery 2 is changed, the rheostat 17 is simultaneously recalibrated. The calibration of the rheostat is such that the ratio of the main field to the differential field in generator G has the singular value expressed by the above-given equation for any speed adjustment and hence for any voltage of the generator G.

When during the driving performance of the motor M, the diameter of the material reeled onto the core 3 builds up, the current through the armature 8 and series field winding 9 of motor M increases. As a result, the voltage drop in the series field winding 13 of generator G increases also, and this voltage drop changes the value of the differential field accordingly so as to maintain the ratio of main field and differential field in the generator substantially in accordance with the condition expressed by the above mentioned equation $$\frac{\phi m}{\phi d} = \frac{1}{\sqrt{\frac{D2}{D1}+1}}$$

Referring to the speed torque diagram of Fig. 2, the curve 19 shown therein represents the ideal speed torque relationship at which the tension in the material 1 is accurately maintained at a constant value. This curve is hyperbolic in character. The actual performance of a system according to the invention is typified by the curve 20 in Fig. 2. This curve departs only slightly from the ideal curve so that the tension in the material remains within sufficiently close limits over the desired range of speeds. The curve 20 is drawn to intersect or coincide with the ideal curve 19 at approximately the values for lowest and highest reeling speeds, respectively. The remaining maximum error can be reduced by modifying the above-given field ratios slightly so that the curve 20 is shifted toward the left in Fig. 2 in order to distribute the errors between plus and minus values. The close similarity of the actual conditions to the ideal conditions will be further elucidated by the numerical examples given in a later place.

Referring to the above given equation, it will be noted that for any given ratio between maximum and minimum reel diameters, the expression at the right-hand side of the equation remains constant for different operating speeds of the fabricating machinery and hence for different linear traveling speeds of the material to be reeled. In contrast thereto, any change in traveling speed causes a change in the value of the differential field flux $\phi d$ because a change in machinery speed causes a corresponding change in the rotational speed of the generator armature 11 and hence a change in the generated voltage which, in turn, effects a change in the differential field flux. This change in field flux is not necessarily in accordance with that required to maintain the equation satisfied under varying speed conditions. It is, therefore, necessary to recaliberate the field of winding 13 by adjusting the field rheostat 17 in the load circuit 21 when the speed of the machinery 2 is changed, and this is automatically done by the interlock or transmission means 18 between field rheostat 17 and the field adjusting means 6 of the prime mover 5.

The tension-maintaining performance of the above-described system does not necessarily require the presence of the separately excited field winding 10 in the drive motor M. This winding, however, has the advantage of limiting the speed of the motor M under no load conditions. On the other hand, if the field strength of winding 10 is small as compared with that of winding 9, for instance if the separately excited motor field has approximately 30% the strength of the motor series field at full load current and maximum speed corresponding to minimum reel diameters, the speed torque characteristic of the driving motor is not essentially altered by the presence of the added constant motor field. Consequently, the use of the separateley excited field winding on the motor in a drive system according to the invention achieves the advantage of speed limitation without the use of additional protective apparatus and without detrimentally affecting the desired tension regulating operation.

The advantages of the invention will be more fully appreciated from a consideration of the numerical example given in the following.

For a ratio (Q) of ten to one (Q=10) between maximum diameter (D2) and minimum diameter (D1) of the roll of material on the reel core, the relation to be maintained between speed (S) and torque (T) for maintaining constant tension in the material, setting the torque equal to unity for a maximum speed of 1000 R. P. M., is expressed by the following table:

*Table I*

| Speed | Torque |
|---|---|
| 1000 | 1.00 |
| 800 | 1.25 |
| 700 | 1.43 |
| 600 | 1.66 |
| 500 | 2.00 |
| 400 | 2.5 |
| 300 | 3.33 |
| 200 | 5.00 |
| 100 | 10.00 |

If a drive system is used as shown in Fig. 1 and described above but with a reel motor without the separately excited field winding $10$, the relation between the main field and the differential series field in generator G is expressed by $$\frac{\phi m}{\phi d}=\frac{1}{\sqrt{Q}+1}=\frac{1}{\sqrt{10}+1}=0.24.$$

The speed (S) of a direct-current motor is $$S=\frac{E-IR}{K\phi}$$

wherein $\phi$ is the field flux and $K$ a constant equal to the ratio of power loss due to voltage drop at maximum speed to power output. In a series motor operating on the straight portion of its unsaturated characteristic, the flux $\phi$ is proportional to the armature current. Hence $$S=\frac{E-IR}{K_1 I}$$

wherein $K_1$ is another constant.

The voltage drop in the motor-generator circuit, neglecting the circuit resistance, is due to the differential series field of the generator and is directly proportional to the armature current $I$. Consequently, for calculating purposes, the differential generator series field winding can be substituted by a fictitious resistance. For a generator whose main field winding $12$ is excited so as to generate a voltage (V) of 250 volts when alone effective, and assuming that the reel drive motor requires an armature current (I) of 10 amperes for a speed of 1000 R. P. M. at minimum roll diameter, the fictitious substitute resistance (R) has the value $$R=\frac{\phi m}{\phi d}\times\frac{V}{I}=\frac{0.24\times 250}{10}=6 \text{ ohms}.$$

Insertion of the values for S, E, I and R in the speed formula results in $$1000=\frac{250-(10\times 6)}{K_1\times 10}$$

from which the constant $K_1$ can be derived as $K_1=0.019$. The torque (T) of the motor, operating on the straight portion of its saturation characteristic, is $T=K_2 I^2$, and since the torque at maximum speed was above set to have unit value, it follows that $1=K_2 \times 10^2$, and $K_2=0.01$.

By applying the values of the constants $K_1$ and $K_2$ to the above-given speed and torque formulas, the speed torque relations presented in the following table are obtained:

*Table II*

| Speed | Torque |
|---|---|
| 1000 | 1 |
| 800 | 1.39 |
| 700 | 1.68 |
| 600 | 2.05 |
| 500 | 2.59 |
| 400 | 3.33 |
| 300 | 4.53 |
| 200 | 6.5 |
| 150 | 7.9 |
| 100 | 10 |

This speed torque relation is close to that of Table I and corresponds in principle to curve 20 in Fig. 2 as compared with curve 19 representative of Table I.

As set forth previously, a preferred form of the invention involves the addition of a separately excited field winding to the reel motor in order to prevent excessive motor speeds at no load. The speed torque relations presented in the table given below correspond to such a system with a separately excited motor field winding of 30% of the strength of the motor series field winding under conditions otherwise as presented in the foregoing:

*Table III*

| Speed | Torque |
|---|---|
| 1090 | 0.70 |
| 970 | 0.88 |
| 770 | 1.30 |
| 625 | 1.80 |
| 515 | 2.38 |
| 356 | 3.78 |
| 272 | 5.05 |
| 206 | 6.50 |
| 125 | 9.30 |
| 111 | 9.90 |
| 99 | 10.50 |

Comparison of Tables II and III with Table I shows that the actually obtained speed torque relationship is satisfactorily close to the desired values given in Table I, and it should be remembered that the remaining maximum error can be reduced by providing for an equal positive and negative distribution of these errors relative to the desired speed torque characteristic.

It has been stated that systems according to the invention represent an improvement over those disclosed in the above-mentioned copending application in which the proper calibration of the motor armature circuit is effected by means of a resistance series connected in that circuit. While such a resistor has a relatively high power dissipation as compared with the power to be supplied by the generator, such power dissipation is reduced to a minimum or virtually eliminated in a system that, according to the present invention, is provided with a differential series field on the generator. For example, when 10 H. P. is required for the reel drive motor over a 4:1 range in reel diameter, the approximate average power input to be furnished by the generator in a drive system using a series resistor amounts to approximately 24 H. P. In contrast thereto, a system according to the present invention under the same conditions requires only an average power input of approximately 10 H. P. Both values for the power input in the two compared systems vary somewhat in dependence upon the efficiency of the motor and hence can be taken only as representing approximate conditions. However, in any event, the saving in power demand achieved by virtue of the present invention is of considerable magnitude.

While I have illustrated only the main circuits of the exemplified drive system, the customary overload and other protective devices and accessories customary in electric drive systems may be added and will be understood by those skilled in the art. Modifications and alterations other than those specifically disclosed may be made within the principles of my invention and without departing from the essential features thereof as set forth in the claims annexed hereto.

I claim as my invention:

1. A core-type reel drive for maintaining substantially constant tension in the material to be reeled, comprising a direct-current reel motor having an armature, a series-field winding and a separately-excited field winding and being rated to operate along the unsaturated and substantially straight portion of its magnetic characteristic over the range of desired reeling speeds; a generator having an armature for providing voltage for said motor, a main field winding, and a series field winding differentially related to said main field winding; circuit means attached to said separately-excited motor field winding to provide constant excitation therefor; circuit means attached to said main field winding to provide constant excitation therefor; a circuit including said two armatures and said two series-field windings in series relation to one another; and a field rheostat associated with said series-field winding of said generator and having a resistance rated to substantially maintain between the magnetic flux values $\phi m$ and $\phi d$ of said main field winding and said generator series field winding respectively the relation $$\frac{\phi m}{\phi d} = \frac{1}{\sqrt{\frac{D2}{D1}+1}}$$

wherein D2/D1 is the ratio of maximum to minimum diameters of the reel of material to be driven by said motor.

2. A core-type reel drive for maintaining substantially constant tension in the material to be reeled, comprising a direct-current reel motor having an armature and a series field winding and being rated to operate along the unsaturated and substantially straight portion of its magnetic characteristic over the range of desired reeling speeds; a generator having an armature for providing voltage for said motor, a main field winding, and a series field winding differentially related to said main field winding; circuit means attached to said main field winding to provide constant excitation therefor; a circuit including said two armatures and said two series-field windings in series relation to one another; and calibrating means associated with said series field winding of said generator adjusting the fluxes $\phi m$ and $\phi d$ of said main field winding and said generator series field winding to substantially correspond to the equation $$\frac{\phi m}{\phi d} = \frac{1}{\sqrt{\frac{D2}{D1}+1}}$$

wherein D2/D1 is the ratio of maximum to minimum diameters of the reel of material to be driven by said motor.

3. A core-type reel drive for maintaining substantially constant tension in the material to be reeled, comprising a direct-current reel motor having an armature, a series-field winding and a separately-excited field winding and being rated to operate along the unsaturated and substantially straight portion of its magnetic characteristic over the range of desired reeling speeds; a generator having an armature for providing voltage for said motor, a main field winding, and a series field winding differentially related to said main field winding; drive means connected with said generator armature for driving the latter at a speed proportional to the linear travelling speed of the material, and speed-adjusting means associated with said drive means for varying said travelling speed; circuit means attached to said separately-excited motor field winding to provide constant excitation therefor; circuit means attached to said main field winding to provide constant excitation therefor; a circuit including said two armatures and said two series-field windings in series relation to one another; and a field rheostat associated with said series field winding of said generator and connected with said speed-adjusting means in order to be adjusted together with the latter so as to maintain, regardless of the value of said travelling speed, the fluxes $\phi m$ and $\phi d$ of said main field winding and said generator field winding substantially in accordance with the equation $$\frac{\phi m}{\phi d} = \frac{1}{\sqrt{\frac{D2}{D1}+1}}$$

wherein D2/D1 is the ratio of maximum to minimum diameters of the reel of material to be driven by said motor.

4. A core-type reel drive for maintaining substantially constant tension in the material to be reeled, comprising a direct-current reel motor having an armature and a series field winding and being rated to operate along the unsaturated and substantially straight portion of its magnetic characteristic over the range of desired reeling speeds; a generator having an armature for providing voltage for said motor, a main field winding, and a series field winding differentially related to said main field winding; drive means connected with said generator armature for driving the latter at a speed proportional to the linear travelling speed of the material, and speed-adjusting means associated with said drive means for varying said travelling speed; circuit means attached to said main field winding to provide excitation therefor; a circuit including said two armatures and said two series-field windings in series relation to one another; and calibrating means associated with said series field winding of said generator and connected with said speed-adjusting means in order to be adjusted together with the latter so as to maintain, regardless of the value of said travelling speed, the fluxes $\phi m$ and $\phi d$ of said main field winding and said generator field winding substantially in accordance with the equation $$\frac{\phi m}{\phi d} = \frac{1}{\sqrt{\frac{D2}{D1}+1}}$$

wherein D2/D1 is the ratio of maximum to minimum diameters of the reel of material to be driven by said motor.

5. A core-type reel drive for maintaining substantially constant tension in the material to be reeled, comprising a direct-current reel motor having an armature, a series field winding and a separately-excited field winding and being rated to operate along the unsaturated and substantially straight portion of its magnetic characteristic over the range of desired reeling speeds, said field windings being cumulative relative to each other and rated so that the field of said separately-excited field winding has about 30% of the strength of said separately-excited field winding at the value of current flowing in said series field winding when the reel diameter is at a minimum; a generator having an armature for providing voltage for said motor, a main field winding, and a series field winding differentially related to said main field winding; circuit means attached to said separately-excited motor field winding to provide constant excitation therefor; circuit means attached to said main field winding to provide constant excitation therefor; a circuit including said two armatures and said two series-field windings in series relation to one another; and a field rheostat associated with said series-field winding of said generator and having a resistance rated to substantially maintain between the magnetic flux values $\phi m$ and $\phi d$ of said main field winding and said generator series field winding respectively the relation $$\frac{\phi m}{\phi d} = \frac{1}{\sqrt{\frac{D2}{D1}+1}}$$

wherein D2/D1 is the ratio of maximum to minimum diameters of the reel of material to be driven by said motor.

WALTER R. HARRIS.

REFERENCES CITED

The following references are of record in the file of this patent:

UNITED STATES PATENTS

| Number | Name | Date |
|---|---|---|
| 1,943,084 | Mohler | Jan. 9, 1934 |
| 2,390,812 | Snyder | Dec. 11, 1945 |